(12) United States Patent
Neacsu (10) Patent No.: US 7,577,006 B2
(45) Date of Patent: Aug. 18, 2009

(54) NON-LINEAR DROOP CONTROL SYSTEM AND METHOD FOR ISOCHRONOUS FREQUENCY OPERATION

(75) Inventor: Dorin O. Neacsu, Westford, MA (US)

(73) Assignee: Azure Dynamics Corp., Woburn, MA (US)

( * ) Notice: Subject to any disclaimer, the term of this patent is extended or adjusted under 35 U.S.C. 154(b) by 396 days.

(21) Appl. No.: 11/440,509

(22) Filed: May 25, 2006

(65) Prior Publication Data

US 2007/0274114 A1 Nov. 29, 2007

(51) Int. Cl.
*H02M 7/00* (2006.01)
*H02M 3/24* (2006.01)
(52) U.S. Cl. .......................................... 363/71; 363/95
(58) Field of Classification Search .................... 363/65, 363/71, 72, 98, 95, 97, 131; 323/207; 307/82
See application file for complete search history.

(56) References Cited

U.S. PATENT DOCUMENTS

| 5,745,356 | A | 4/1998 | Tassitino, Jr. et al. | |
|---|---|---|---|---|
| 6,693,409 | B2 * | 2/2004 | Lynch et al. | 323/207 |
| 6,803,679 | B1 * | 10/2004 | Luo et al. | 363/65 |
| 7,333,352 | B2 * | 2/2008 | Petter et al. | 363/98 |

OTHER PUBLICATIONS

Laszlo Balogh, *Paralleling Power- Choosing and Applying the Best Technique for Load Sharing* pp. 6-1-6-30, Texas Instruments (2003).

Shinzo Tamai et al., *Parallel Operation of Digital Controlled UPS System*, IECON, pp. 326-334 vol. 1 (1991).
A. Taladhar et al., *Parallel Operation of Single Phase Inverter Modules With No Control Interconnections*, IEEE APEC, pp. 94-100, vol. 1 (1997).
Shiguo Luo, et al., *A Classification and Evaluation of Paralleling Methods for Power Supply Modules*, IEEE PESC, (1999).
Namho Hur et al., *A Robust Load-Sharing Control Scheme for Parallel-Connected Multisystems*, IEEE Transactions on Industrial Electronics, vol. 47 No. 4 (Aug. 2000).
Ernane Antonio Coelho et al., *Small Signal Stability for Parallel Connected Inverters in Stand-Along AC Supply Systems*, IAS, vol. 4 pp. 2345-2352 (2000).
Uffe Borup Jensen et al., *Sharing of Nonlinear Load in Parallel Connected Three-Phase Converters*, IEEE, pp. 2338-2344 (2000).
Y. B. Byun et al., *Parallel Operation of Three-Phase UPS Inverters by Wireless Load Sharing Control*, Telecon Energy Conference, INTELEC, pp. 526-532 (2000).

(Continued)

*Primary Examiner*—Jessica Han
(74) *Attorney, Agent, or Firm*—Iandiorio Teska & Coleman (57) ABSTRACT

Non-linear frequency droop control for isochronous frequency operation of parallel inverters includes generating a droop constant corresponding to the power level of the given inverter for maintaining the predetermined frequency range of the given inverter; generating the droop from the given inverter power level and the droop constant and calculating in response to the droop, the incremental shift in the output voltage waveform of a given inverter operating in a predfreytermined limited frequency range to enable current sharing among the inverters.

11 Claims, 11 Drawing Sheets

OTHER PUBLICATIONS

S. J. Chiang et al., *Parallel Control of the UPS Inverters With Frequency-dependent Droop Scheme*, PECS, vol. 2, pp. 957-961 (2001).

Jong-Woo Choi et al., *A New Compensation Strategy Reducing Voltage/Current Distortion in PWM VSI Systems Operating with Low Output Voltages*, IEEE Transactions on Industry Application, vol. 31, (Sep./Oct. 1995).

Mukul Chandorkar, *Uninterruptible Power Supplies*, ABB Corporate Research, Ltd. CH-5405 Baden-Dattwil, Switzerland.

Tore Skjellnes et al., *Load Sharing for Parallel Inverters Without Communication*, NORPIE, Nordic Workshop on Power and Industrial Electronics, (Aug. 12-14, 2002).

Ali Keyhani et al., *Parallel Operation of Power Converters for Applications to Distributed Energy Systems*, The Ohio State University, Department of Electrical Engineering, Columbus, Ohio 43210, pp. 1-6.

Jung-Won Kim et al., *A Novel Droop Method for Converter Parallel Operation*, IEEE Transactions on Power Electronics, vol. 17, No. 1, (Jan. 2002).

Hoff E. Skjellnes et al., *Paralleled Three-Phase Inverters*, Department of Electrical Power Engineering, Norweigian University of Science and Technology, NTNU, Norway (2004).

K. De Brabandere et al., *A Voltage and Frequency Droop Control Method for Parallel Inverters*, 2004 35$^{th}$ IEEE Power Electronics Specialists Conference, Germany, pp. 2501-2507 (2004).

Mohammad N. Marwali et al., *Control of Distributed Generation Systems—Part II: Load Sharing Control*, IEEE Transactions of Power Electronics, vol. 19, No. 6 (Nov. 2004).

Xikun Chen et al., *Research on Parallel Operation of High Frequency UPSs*, Department of Electric and Electronic Engineering, Huazhong University of Science and Technology, Department of Control Engineering, Zhengzhou University of Light Industry, Wuhan, Hubei Province, P.R. China, PESC, p. 276-281 (2005).

Zhihong Ye, *Modeling and Control of Parallel Three-Phase PEM Converters* Dissertation submitted to the Faculty of the Virginia Polytechnic Institute and State University (Sep. 15, 2000).

Zhihong Ye, *Design of Parallel Sources in DC Distributed Power System by Using Gain-Scheduling Technique Center for Power Electronics Systems* (CPES) Virginia Polytechnic Institute and State University, IEEE 1999.

Yao et al., "Development of Communicationless Hot-Swap Paralleling for Single-Phase UPS Inverters based on Adaptive Droop Method", IEEE, Feb. 15-19, 2009, Applied Power Electronics Conference and Exposition, 2009, APEC Fourth Annual IEEE, pp. 1283-1287.

* cited by examiner

FIG. 1

(PRIOR ART DROOP)

NON-LINEAR DROOP CONTROL SYSTEM AND METHOD FOR ISOCHRONOUS FREQUENCY OPERATION

FIELD OF THE INVENTION

This invention relates to a non-linear frequency loop control system and method for parallel operation of inverters with isochronous frequency operation.

BACKGROUND OF THE INVENTION

Many mobile applications count on an auxiliary power distribution system that converts energy from a variable input DC bus to a regulated output three-phase four-wire power system. Such auxiliary power distribution system units are already built as DC/DC/AC stand-alone units and they equip certain vehicles.

Parallel operation of inverters to deliver more power across the load was the subject of intense research effort. Previous solutions propose paralleling at the insulated gate bipolar transistor level, at the inverter leg level, or after the line impedance. Since conventional units are packaged and located on different vehicles, their parallel connection should happen outside the main converter box, after the filter. For this situation, the industry's most used solution relies on the droop coefficient method. This method calculates the active and reactive components of power at the point of load and modifies both the magnitude based on reactive power components and phase (or frequency) based on active power component to provide power sharing. This modifying of the frequency based on the active power component constitutes a serious shortcoming when working with loads that require fixed, constant frequency for proper operation.

Different standards for power systems specify the electronic power converter to maintain frequency regulation within 0.25% of the setting as opposed to approximately 3% for mechanical governors. When using a single power converter to constitute a power source, the steady-state frequency can easily be maintained within the required range. When connecting multiple inverter-based power sources in parallel, this control strategy will result in oscillating power on the common bus each time there is a phase difference between the two power sources. Even the use of a closed-loop approach to frequency regulation and phase adjustment (e.g. PLL type) would lead to a conflict between the two or more controllers. The compromise solution consists in introducing a droop characteristic which means that the frequency is not restored to its reference value after each load power transient but instead is changed inversely proportional to the load. Different solutions have been proposed for open-loop or closed loop droop control of frequency. Open-loop operation is possible since the inverter-filter-load system does not influence or alter the generator frequency. Since the output is common during paralleling, closed loop voltage control cannot be implemented. On the other hand, using open loop generation of the voltage introduces problems related to the system non-linearity and voltage drop. Implementation of the droop coefficients method requires calculation of the power components at the point of load. This is usually based on direct measurement of the voltage and current at the inverter output. Operation with isochronous frequency helps the measurement system within the controller. Measurement of output voltage RMS voltage, frequency and instantaneous phase are more accurate when done at a fixed and known frequency than while subjected to large variation ranges. If any closed-loop voltage and/or frequency control system (based on communication between inverters) is used, accurate measurement becomes very important. Finally, it is easier to achieve hot-swap (connection of a power inverter while another one is already working on the bus) when the operation is based on isochronous frequency.

SUMMARY OF THE INVENTION

It is therefore an object of this invention to provide an improved non-linear frequency droop control system and method.

It is a further object of this invention to provide such an improved non-linear frequency droop control system and method for maintaining isochronous frequency operation in a parallel inverter system.

It is a further object of this invention to provide such an improved non-linear frequency droop control system and method which is virtually isochronous.

It is a further object of this invention to provide such an improved non-linear frequency droop control system and method for maintaining frequency within a narrow variation range in a parallel inverter system.

The invention results from the realization that isochronous or virtually isochronous frequency operation of parallel inverters can be achieved with a non-linear frequency droop control system and method that generates a droop constant corresponding to the power level of a given inverter and uses that droop constant along with the power level of that inverter to generate the droop and calculates in response to the droop the incremental shift in the output voltage waveform of a given inverter operating in a predetermined limited frequency range to enable current sharing among the inverters.

This invention features a non-linear frequency droop control system for parallel operation of inverters with isochronous frequency operation including a non-linear droop constant generator for providing a droop constant corresponding to the power level of the given inverter for maintaining the predetermined frequency range of the given inverter. There is a droop coefficient generator for generating the droop coefficient from the given inverter power level and the droop constant. A calculator responsive to the droop coefficient determines the incremental shift in the output voltage waveform of a given inverter operating in a predetermined limited frequency range to enable equal current sharing among the inverters.

In a preferred embodiment there may be a load power calculator for calculating the inverter power level. The load power calculator may include a voltage sensing circuit for sensing the output load voltage of the inverters, an RMS calculator circuit for calculating the RMS of the output voltages and a phase lock loop circuit for measuring the phase of the output voltages at the point of load. The load power calculator may also include a current measurement circuit for measuring the current into and out of the inverters. The load power calculator may also include a voltage component calculator circuit responsive to the RMS voltages and phase to calculate the voltage components and a power calculator circuit responsive to the voltage components and measured current to produce the active and reactive power. The non-linear droop control generator may include a look-up table. The look-up table may contain a range of different droop constants corresponding to a range of different power levels for maintaining the isochronous frequency operation of the given inverter in the predetermined frequency range over the whole range of the different power levels. The inverter may be a multiphase inverter.

This invention also features a method of non-linear frequency droop control for isochronous frequency operation of parallel inverters including calculating in response to the droop coefficient, the incremental shift in the output voltage waveform of a given inverter operating in a predetermined limited frequency range to enable current sharing among the inverters. The droop coefficient is generated from the given inverter power level and the droop constant. The droop constant in turn is generated in correspondence with the power level of the given inverter for maintaining the predetermined frequency range of the given inverter.

In a preferred embodiment the droop constant may include referring to a look-up table which contains a range of different droop constants corresponding to a range of different power levels for maintaining the isochronous frequency operation of the given inverter in the predetermined frequency range over the whole range of the different power levels.

This invention also features a method of non-linear frequency droop control for isochronous frequency operation of a parallel inverter comprising generating a droop constant corresponding to the power level of the given inverter for maintaining the predetermined frequency range of the given inverter and shifting the output voltage waveforms of a given inverter to keep the frequency within the virtually isochronous limited frequency range.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 1:
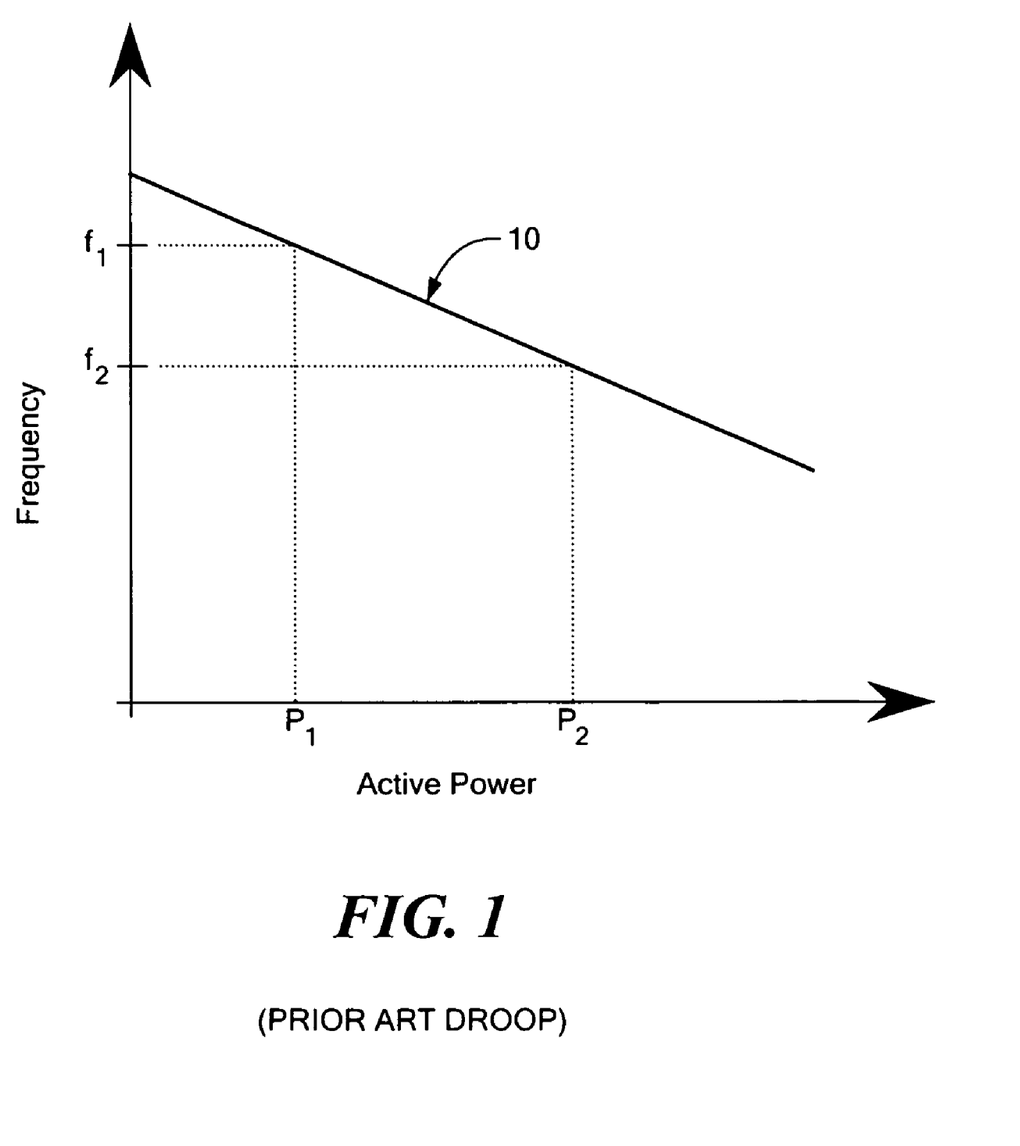
FIG. 1 is an illustration of conventional frequency droop occurring in prior art devices.

There is shown in FIG. 1 a plot of frequency versus active power for an inverter exhibiting a conventional drooping frequency power characteristic 10. The "drooping" control is used so that when the power increases from lower power $P_1$ to higher power $P_2$ the frequency decreases or "droops" from the higher frequency $f_1$ to the lower frequency $f_2$. This control method ensures equal power sharing between the parallel inverters. This droop becomes a problem when an inverter is called upon to increase or decrease its power output in a sharing mode with other inverters on a grid, which may be multiphase, because as the power changes so must the frequency. This is especially disadvantageous when there are loads on the grid which cannot operate properly except at constant fixed frequency. A large value of the negative slope of the frequency-power dependency 10 improves current sharing but produces a larger variation of the output frequency. A smaller value of the slope maintains the frequency within a limited range, providing a good frequency regulation, but may compromise the accuracy of the current sharing when the inverters are not identical. Frequency regulation is defined for the steady-state operation, whilst current sharing is mostly decided during any transient of the load power. Using a small value of the slope tentatively maintains the frequency within a limited range but a very small value induces a very slow response to a power variation that may end up with instability of the system. This reasoning provides an opportunity for nonlinear droop control.

Figure 2:
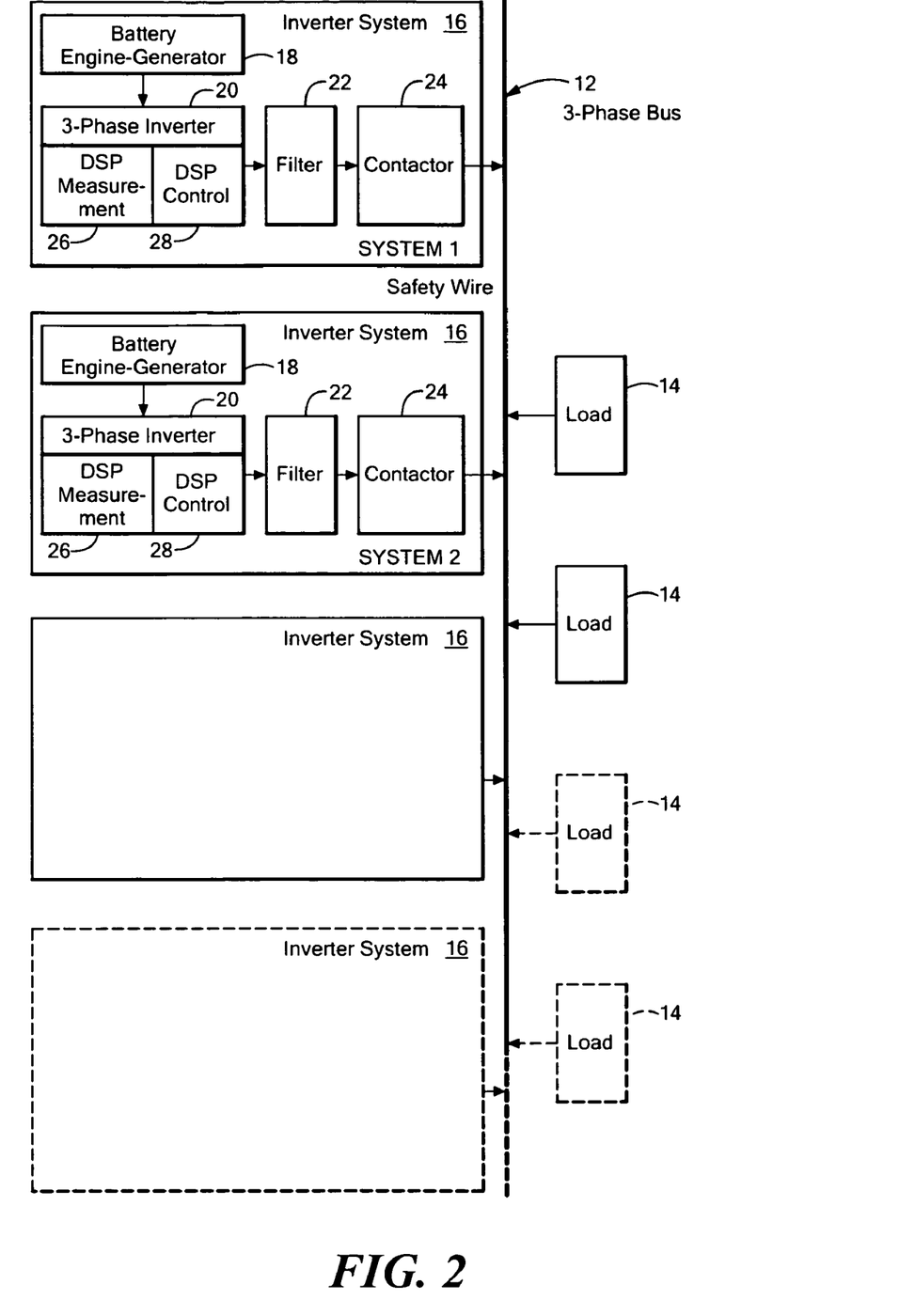
FIG. 2 is a schematic diagram of a multi-inverter, multiphase system with isochronous frequency operation using a frequency non-linear droop control according to this invention.

A typical three-phase bus 12, FIG. 2, may have a number of loads 14 connected to it and be driven in turn by a number of inverter systems 16. Each inverter system includes a battery, engine generator or both 18, an inverter such as three-phase inverter 20, filter 22 and contactor 24 which connects inverter system 16 to multiphase bus 12. Each three-phase inverter includes a measurement digital signal processor (DSP) 26 and a control DSP 28.

Figure 3:
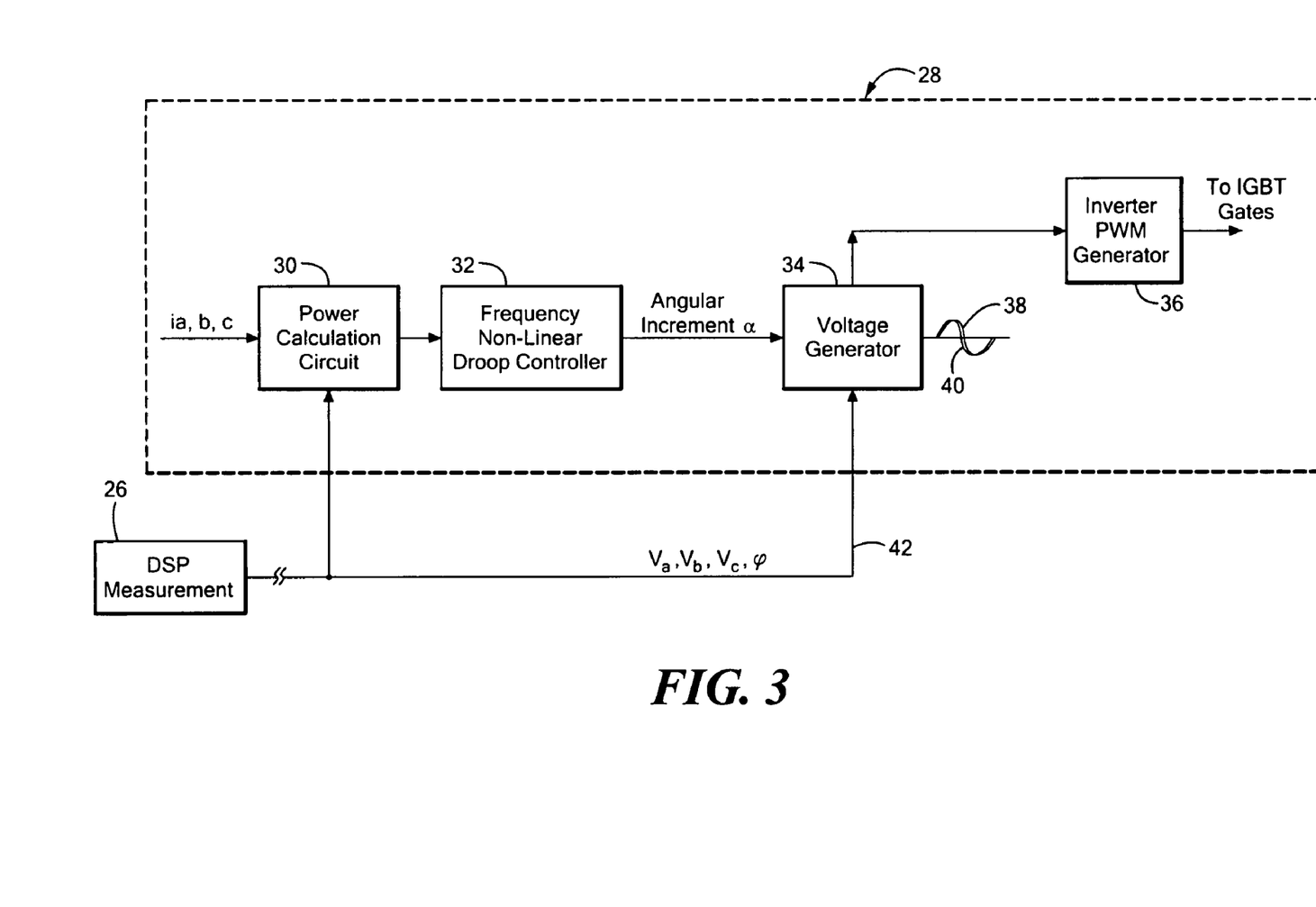
FIG. 3 is a more detailed schematic block diagram of the frequency non-linear droop control system implemented in the control DSP of FIG. 2.

Control DSP 28, FIG. 3, is configured to include power calculation circuit 30, a frequency non-linear droop controller 32, voltage generator 34 and an inverter pulse width modulated (PWM) generator 36. Power calculation circuit 30 provides a power level output to frequency non-linear droop controller 32 whose output is an angular increment α which is provided to voltage generator 34. Voltage generator 34 uses the incremental α values and original voltages, $V_a$, $V_b$, $V_c$, to reconstruct an output voltage waveform 38 shifted, slightly by increments α with respect to the original voltage waveform 40, sufficiently to maintain the frequency within the isochronous predetermined limited frequency range while providing the proper share of the power to the multiphase bus 12. The original voltages $V_a$, $V_b$, $V_c$ are provided on line 42 from measurement DSP 26. The output voltage waveform 38 is provided to inverter PWM generator 36 which provides the insulated gate bipolar transistor (IGBT) gates to ultimately produce the AC output.

Figure 4:
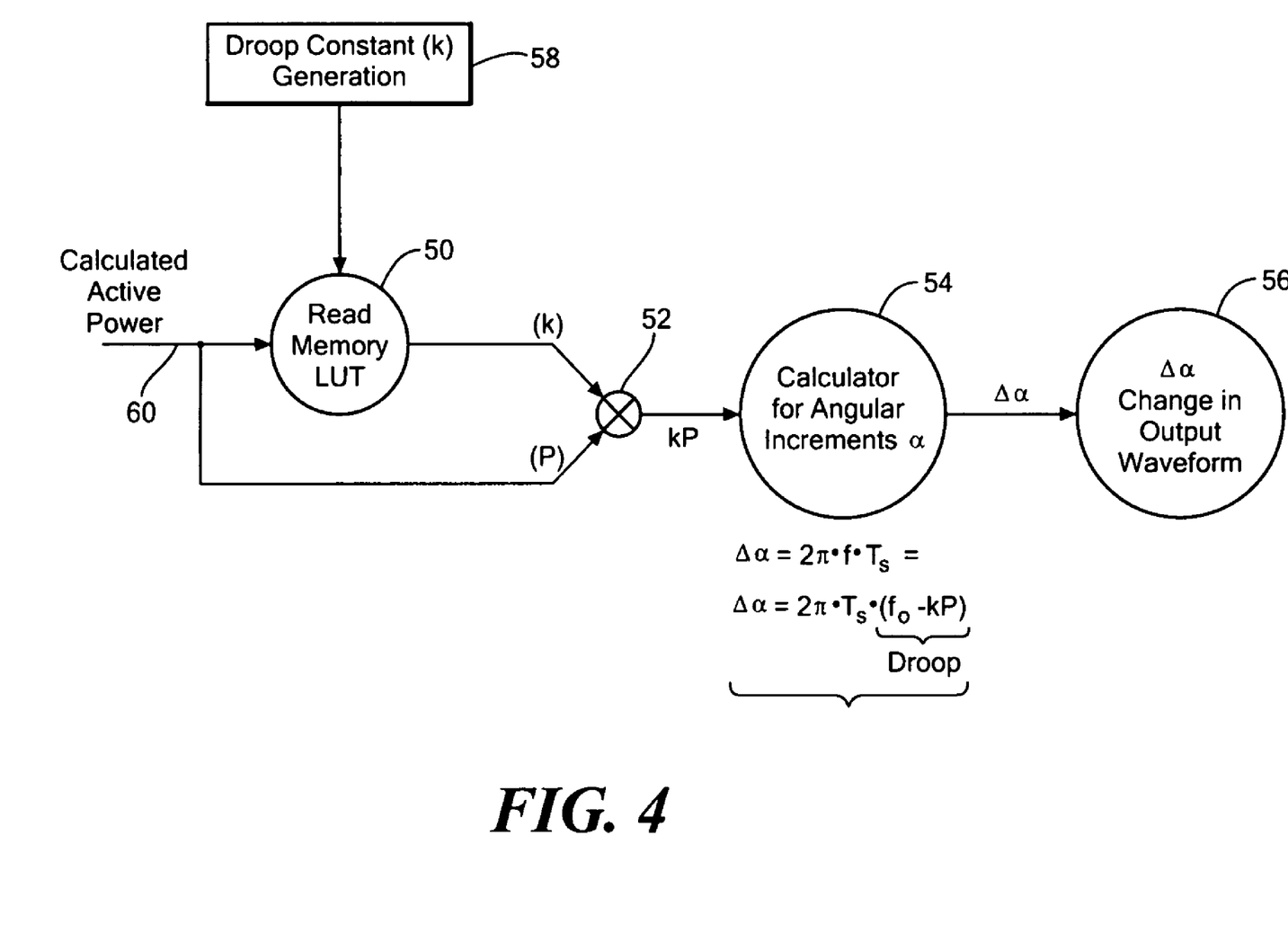
FIG. 4 is a more detailed schematic block diagram of the frequency non-linear droop controller of FIG. 3.

Frequency non-linear droop controller 32, FIG. 4, includes, a read memory look-up table 50, multiplier 52 and a calculator for angular increment α 54 all of which are configured in control DSP 28, FIG. 2. The function of this circuit is to calculate Δα which is the change in output waveform (the output indicated at 56) which ultimately is received by voltage generator 34 in FIG. 3. The calculation of Δα is accomplished according to the equation:

$$\Delta\alpha = 2\pi \cdot f \cdot T_s \qquad (1)$$

This is also expressed as:

$$\Delta\alpha = 2\pi \cdot T_s \cdot (f_o - kP) \quad (2)$$

where, $f_o-kP$ represents new value for the output frequency and $f_o$ is nominal frequency, kP represents the droop, k being the droop constant and P being active power delivered into the load. The value of $T_s=1/$(sampling frequency of the system) e.g. 19,200 Hz.

In operation the droop constant, k, is calculated offline at 58, FIG. 4, and stored within the look-up table 50, while the active power level is calculated by the control DSP 28 on line 60. The active power level from input 60 reads a particular gain, k, (droop constant) from look-up table 50 and provides it to multiplier 52. The power level at input 60 is also provided to multiplier 52, the output of which is then kP, the droop. The incremental value, $\Delta\alpha$, is then calculated by the calculator for angular increments 54 in accordance with equation (2). It is this incremental value $\Delta\alpha$ that is output to voltage generator 34 to reform or shift voltage output waveform 38, FIG. 3, to obtain the final voltage waveform 40 that is submitted to inverter PWM generator 36. The present implementation shown in FIGS. 3 and 4 may be implemented in whole or part in software/firmware incorporated in the control DSP 28.

The operation of the control DSP 28 and measurement DSP 26 in generating, the active load power at 60 is explained with reference to FIG. 4a. There, measurement DSP 26 is configured to sense output voltage 110 at the point of load (POL). The frequency and phase information are provided with a phase locked loop (PLL) circuit 112 developed in the DSP 26 software. PLL circuit 112 represents a conventional software based PLL operated on the fundamental output frequency. Measurement DSP 26 also calculates the RMS values 114 of the output voltages. The instantaneous phase is read from PLL circuit 112 and provided at each control cycle of the control DSP 28. These are further used for calculation of the power components at each control cycle.

Figure 4A:
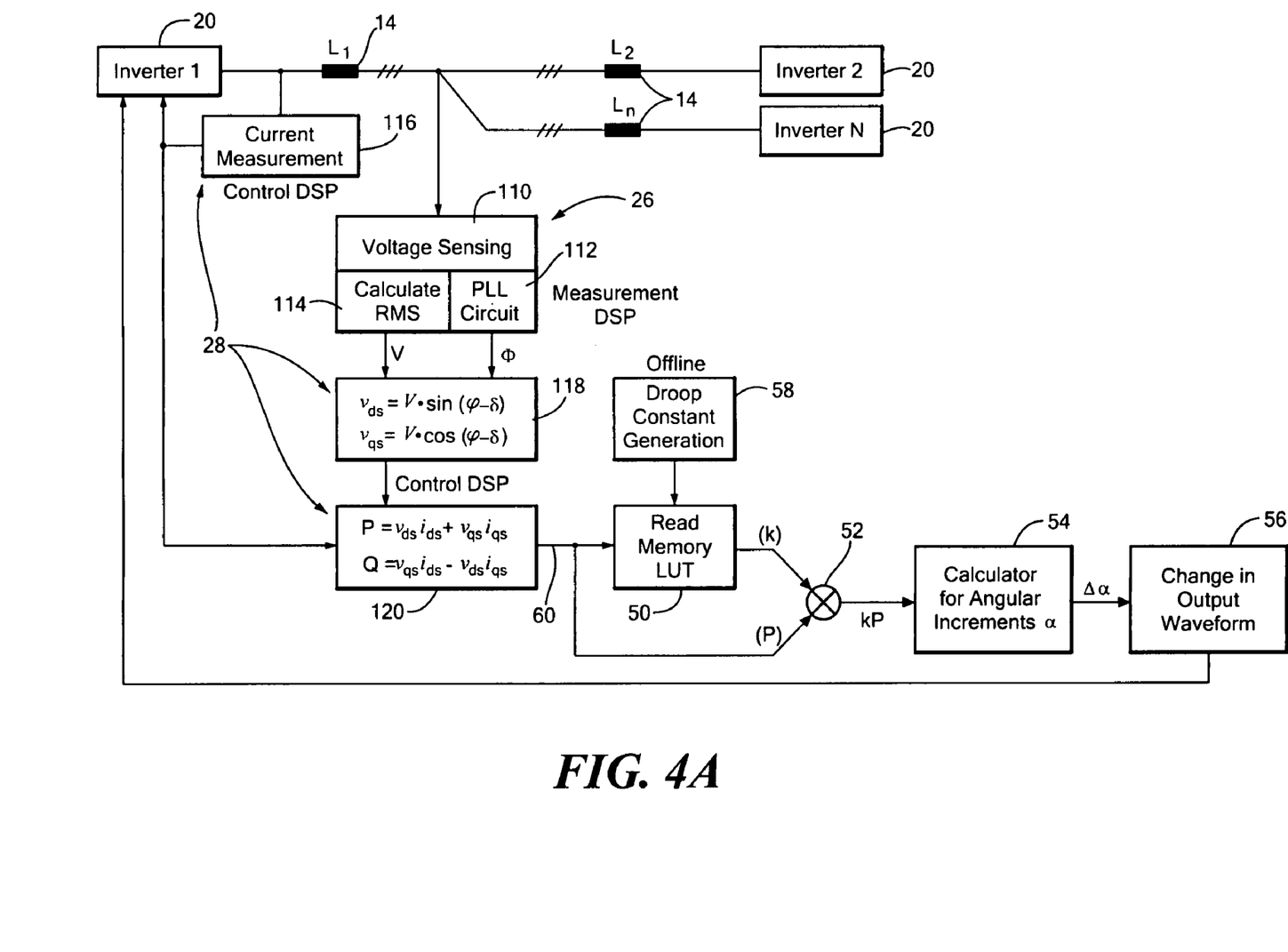
FIG. 4a is a more detailed schematic block diagram of the frequency non-linear droop controller of FIG. 4 showing the generation of the active power.

In FIG. 4a control DSP 28 includes current measurement circuit 116, voltage component calculator 118 and the power calculator 120 which responds to the voltage components from voltage component calculator 18 and current for current measurement circuit 116 to generate the quadrature power, P=active power and Q=reactive power. The active power, P, is provided at 60.

The DSP control system 28 generates voltages in open loop based on a magnitude (modulation index) reference. The angular coordinate used in voltage generation is internally generated by this DSP denoted herein with $\delta$. The RMS value and the phase coordinates of the common bus voltage in the POL reference system are calculated within the measurement DSP 26. The droop method is based on calculation of the power components at POL connection, after the filter or the inter-converter inductors.

The load voltages in the POL reference system (consider an angular coordinate $\phi$ different from the phase of the reference waveforms) are calculated based on the instantaneous phase $\phi$ provided by the measurement DSP 26.

$$\begin{cases} v_{as} = V \cdot \sin\varphi_1 \\ v_{bs} = V \cdot \sin\left[\varphi_1 - \frac{2\cdot\pi}{3}\right] \\ v_{cs} = V \cdot \left[\varphi_1 - \frac{4\cdot\pi}{3}\right] \end{cases}$$

The vector transform in the inverter system of reference (co-ordinates):

$$\begin{cases} v_{ds} = v_{as}\cdot\cos\delta + v_{bs}\cdot\cos\left[\delta - \frac{2\cdot\pi}{3}\right] + v_{cs}\cdot\cos\left[\delta - \frac{4\cdot\pi}{3}\right] \\ v_{qs} = v_{as}\cdot\sin\delta + v_{bs}\cdot\sin\left[\delta - \frac{2\cdot\pi}{3}\right] + v_{cs}\cdot\sin\left[\delta - \frac{4\cdot\pi}{3}\right] \end{cases} \quad (4)$$

Applying this transform to the set of equations from above yields the direct expression of the POL voltages in the inverter system of reference (coordinates):

$$\begin{cases} v_{ds} = \frac{3}{2}\cdot V \cdot \sin[\varphi_1 - \delta] \\ v_{qs} = \frac{3}{2}\cdot V \cdot \cos[\varphi_1 - \delta] \end{cases} \quad (5)$$

where V corresponds to the RMS value of voltages measured by the measurement DSP 26 on each phase, at the common bus.

The power components can be calculated for each phase with currents measured directly at the DSP control 28 and transformed in (d,q) components:

$$\begin{cases} P_A = v_{dsA}\cdot i_{dsA} + v_{qsA}\cdot i_{qsA} & P_B = v_{dsBA}\cdot i_{dsB} + v_{qsB}\cdot i_{qsB} & P_C = v_{dsC}\cdot i_{dsC} + v_{qsC}\cdot i_{qsC} \\ P_A = v_{qsA}\cdot i_{dsA} - v_{dsA}\cdot i_{qsA} & P_B = v_{qsB}\cdot i_{dsB} - v_{dsB}\cdot i_{qsB} & P_C = v_{qsC}\cdot i_{dsC} - v_{dsC}\cdot i_{qsC} \end{cases} \quad (6)$$

The droop equations use these power components to adjust the magnitude and frequency of the three-phase system applied to the load by each inverter:

$$\begin{cases} V = V_0 - k_P \cdot Q \\ \omega = \omega_0 - k_Q \cdot P \end{cases} \quad (7)$$

where $\omega$ is the instantaneous value of the frequency used to calculate the phase increment.

Figure 5:
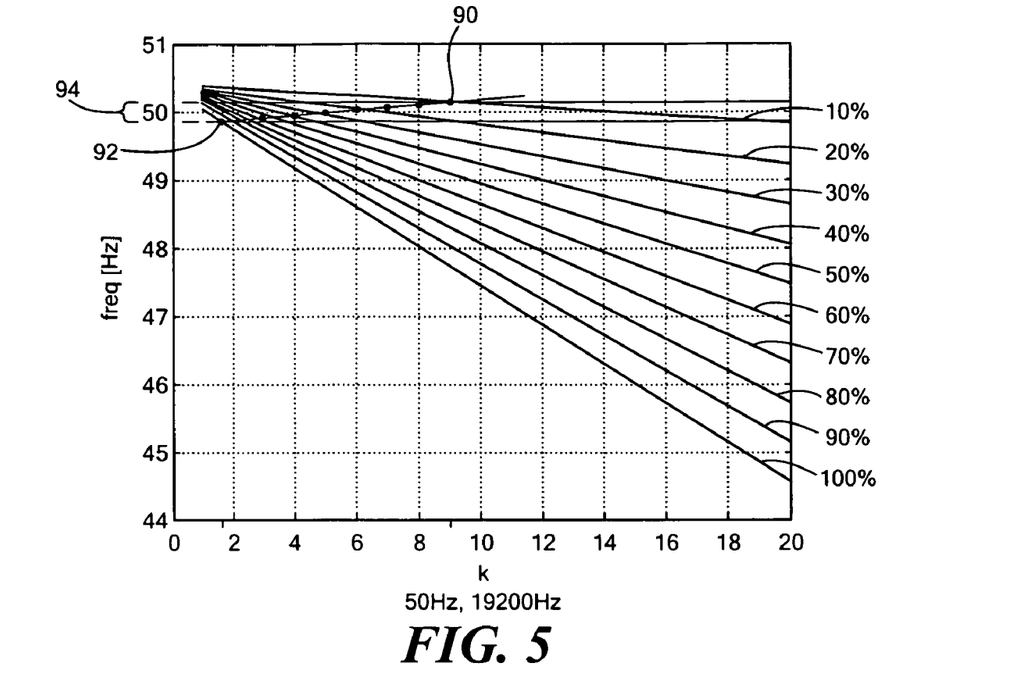
FIGS. 5-7 illustrate variation of frequency with respect to droop constant k at 10% power intervals for 50 Hz, 60 Hz and 400 Hz and the isochronous predetermined limited frequency range.
Figure 6:
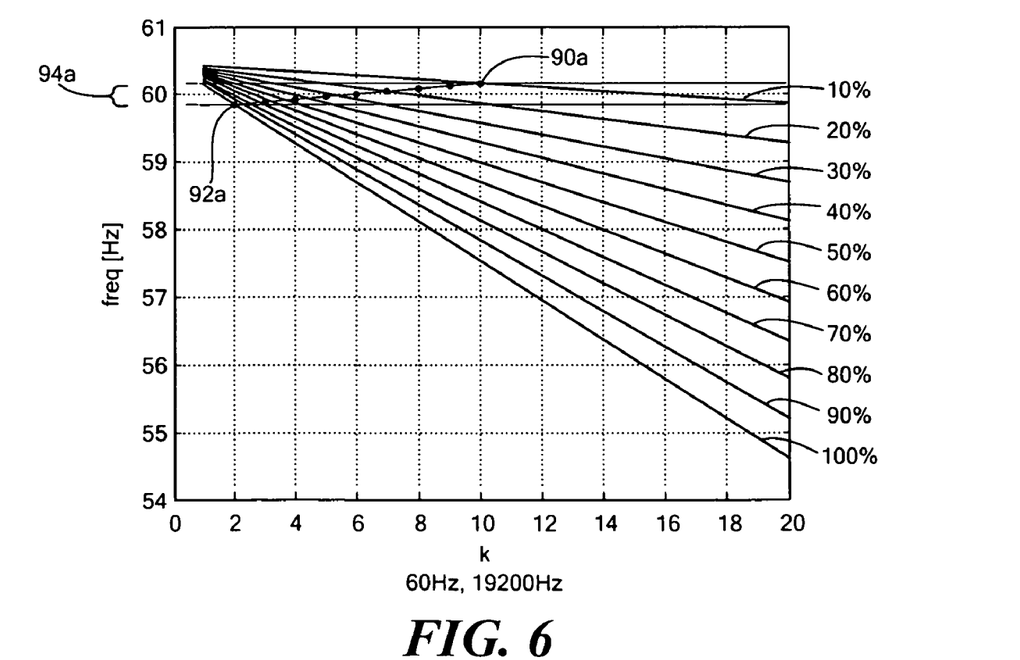
Figure 7:
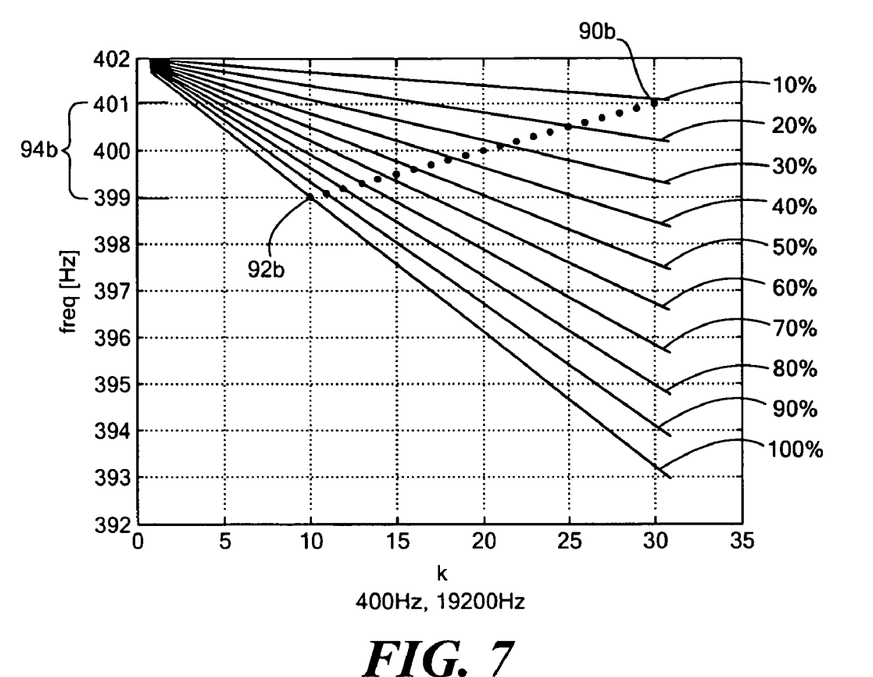
Figure 8:
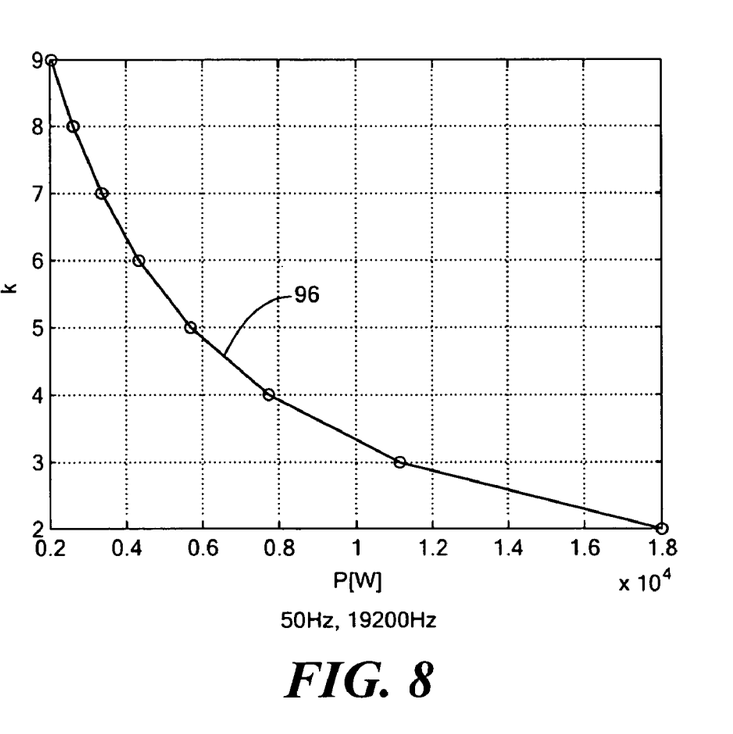
FIGS. 8-10 illustrate variation of droop constant k with respect to power in the predetermined limited ranges defined in FIGS. 5-7, respectively.
Figure 9:
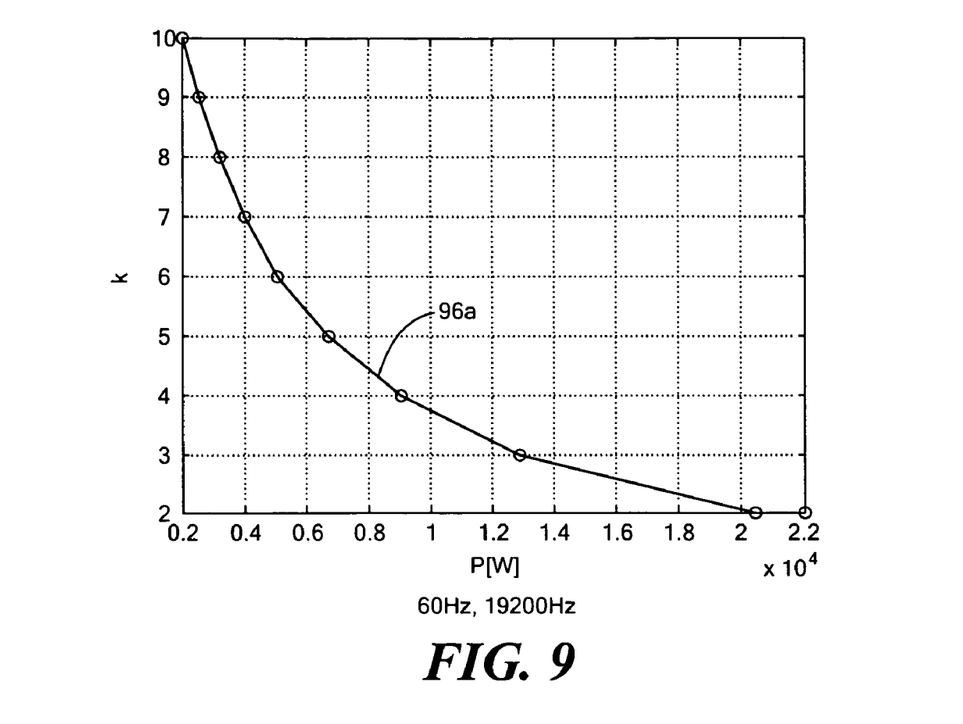
Figure 10:
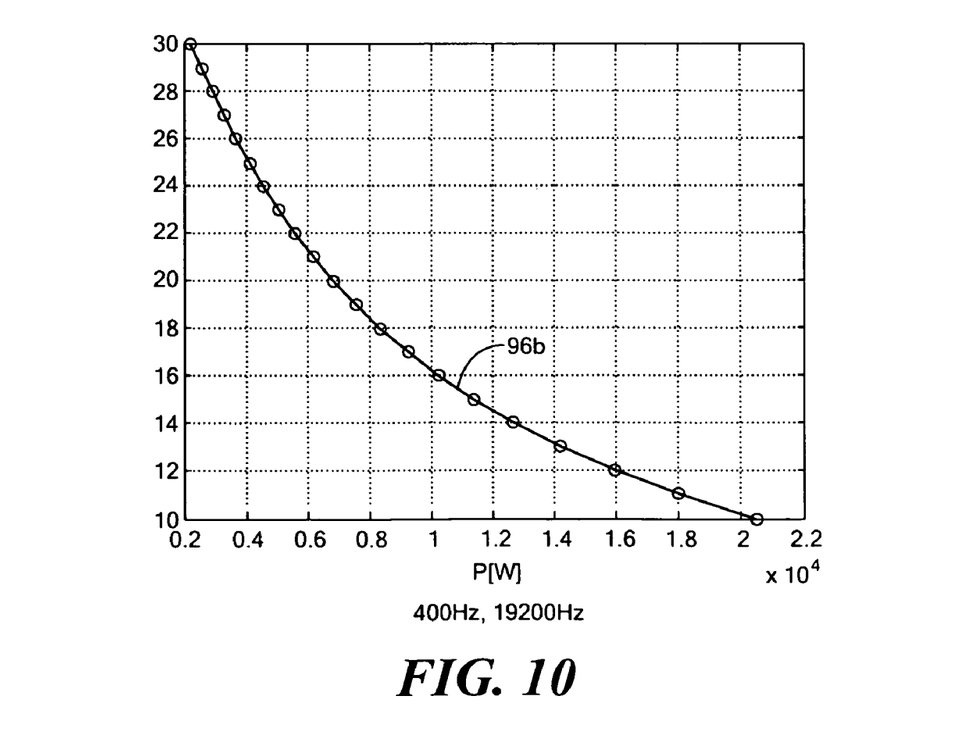
Figure 11:
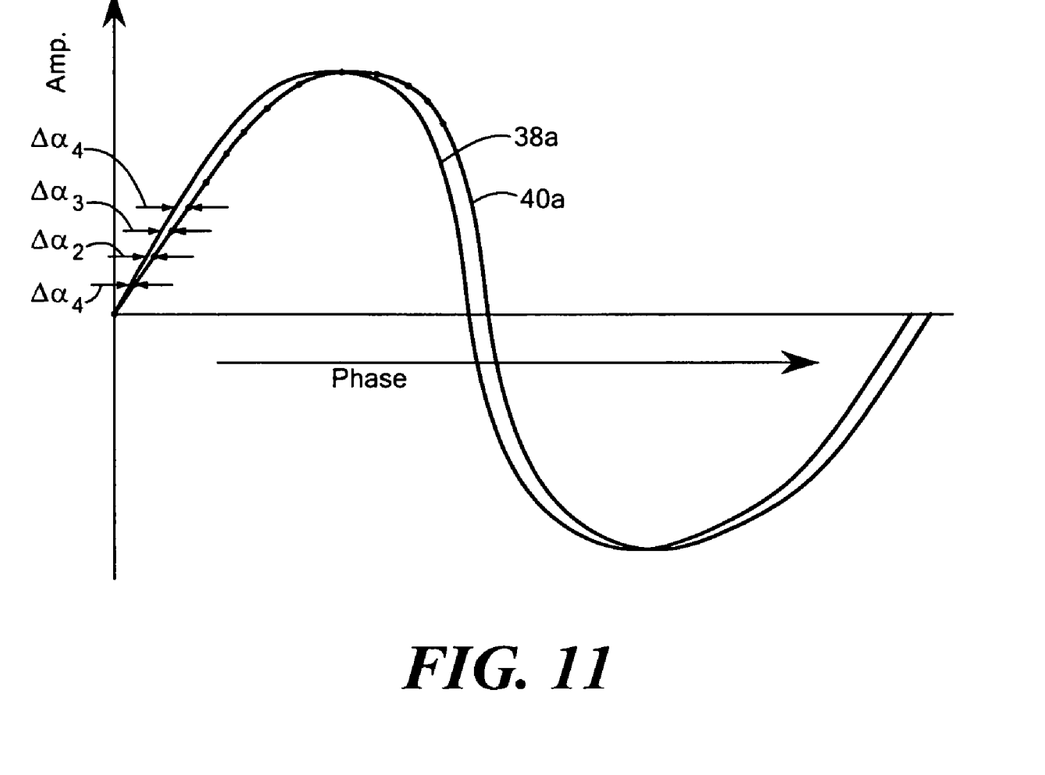
FIG. 11 is a plot of phase vs. amplitude illustrating the incremental shift of the voltage waveform of the voltage generator of FIG. 3 to effect the power sharing while preserving frequency constancy.
Figure 12:
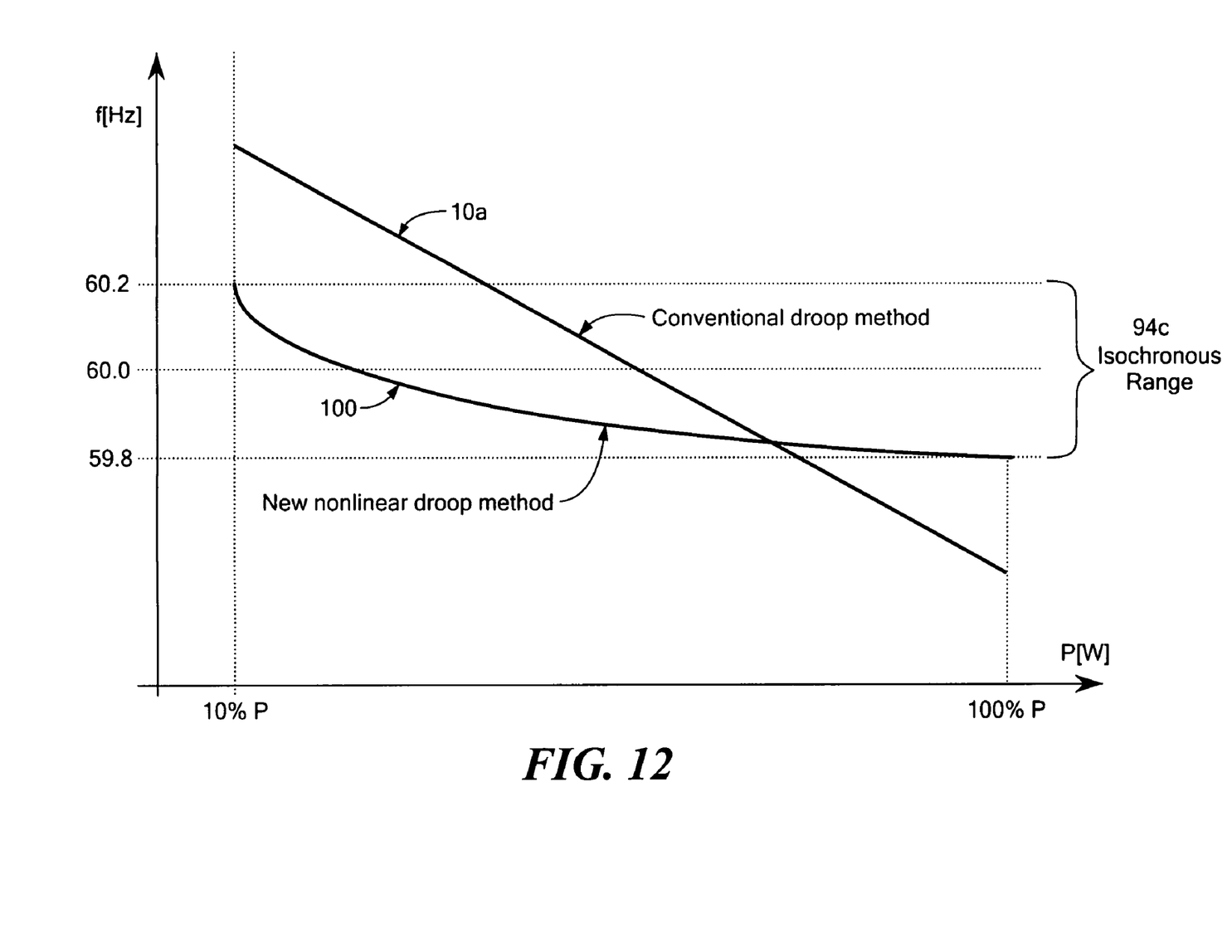
FIG. 12 is an illustration of conventional droop and non-linear droop according to this invention.

The droop constant values stored in look-up table 50 are generated as explained in the following, with respect to FIGS. 5-10. In FIG. 5, $f_o=50$ Hz and system sampling $T_s=19,200$ Hz. There are ten "frequency versus k", characteristics in FIG. 5 labeled 10%-100% representing the inverter power at a 10% level through a 100% level in 10% increments. Assuming that the isochronous predetermined limited frequency range chosen is 49.8 Hz to 50.2 Hz centered about 50 Hz, then it can been seen in FIG. 5 that at lowest power, 10%, the maximum frequency of 50.2 Hz is reached at 90 where droop constant, k, is 9. In contrast when the power is 100% the minimum limit 49.8 Hz is reached at 92 where droop constant, k, is 1.8. Thus by choosing the appropriate value of the droop constant, k, for any power percentage the frequency can be kept within the virtually isochronous predetermined limited frequency range 94, instead of falling or drooping as occurs in conventional systems. With this realization, characteristic 96, FIG. 8, defines all of the values of, k, that can be used at each power level to keep the inverter operating within the isochronous predetermined limited frequency range 94. Similarly in FIG. 6, where $f_o$ is equal to 60 Hz the extremes 90a and 92a define a range 94a between 59.8-60.2 Hz and characteristic 96a, FIG. 9, defines all the values of, k, for the various power levels which keep the inverter frequency in the desired isochronous predetermined limited frequency range. And in FIG. 7, where $f_o$ is equal to 400 Hz, the isochronous predetermined limited frequency range 94b from 399-401 Hz results in characteristic 96b, FIG. 10, which defines all of the values of, k, for the various power levels that maintain the inverter within the isochronous predetermined limited frequency range. It is these values represented at 96a, 96b in FIGS. 8-10, respectively, that are stored in look-up table 50. Alternatively, the values of k stored in the look-up table could be calculated real time but presently this would be a much slower approach and the look-up table approach is preferred. Other alternatives would store directly the value of $\Delta\alpha$ in a look-up table to be read based on the power level. This would reduce the calculation by one multiplication. The resulting $\Delta\alpha$ incremental values are applied to shift the original voltage waveform 38a to the output voltage waveform 40a, as shown enlarged and in greater detail in FIG. 11, with a few of the incremental steps $\Delta\alpha_1$, $\Delta\alpha_2$, $\Delta\alpha_3$, $\Delta\alpha_4$ labeled specifically. The difference between the conventional droop and the non-linear droop of this invention is contrasted dramatically in FIG. 12 where the traditional droop characteristic 10a has a large portion, approximately ⅔ or more, outside of the isochronous predetermined limited frequency range 94c, while the non-linear droop 100, according to this invention, is wholly within range 94c limited by frequencies 59.8 Hz and 60.2 Hz and is virtually isochronous.

Figure 13:
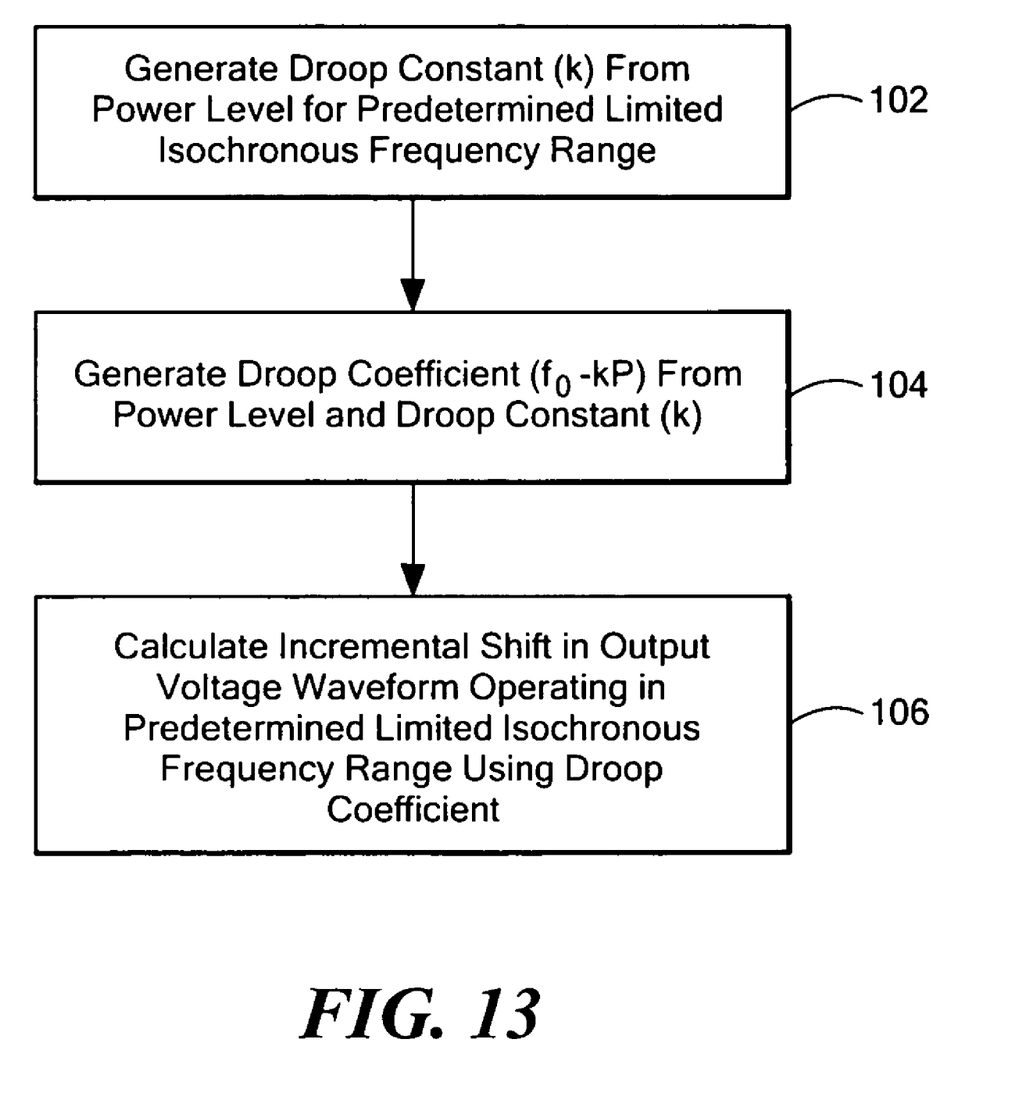
FIG. 13 is a flow chart of the method of effecting non-linear droop according to this invention.

Relying on these conditions the invention is realized in the method of non-linear frequency droop control for isochronous frequency operation of a parallel inverter comprising generating a droop constant corresponding to the power level of the given inverter for maintaining the predetermined frequency range of the given inverter and shifting the output voltage waveforms of a given inverter to keep the frequency within the virtually isochronous limited frequency range. One implementation of the method of non-linear frequency droop control as shown in FIG. 13 where in step 102 there is generated the droop constant, k, from the power level. This droop constant insures that for any power level the inverter will remain operating within the isochronous predetermined limited frequency range. This droop constant is used to generate the droop, kP, from the power level and droop constant in step 104. Then the incremental shift $\Delta\alpha$ is calculated in step 106 to shift the output voltage waveform using the droop so that the inverter operates in the predetermined limited isochronous frequency range while contributing its designated share of the power to the three-phase bus.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A non-linear frequency droop control system for parallel operation of inverters with isochronous frequency operation comprising;
    a non-linear droop constant generator for providing droop constant corresponding to the power level of a given inverter for maintaining said predetermined limited frequency range of said given inverter;
    a droop generator for generating the droop from the given inverter power level and said droop constant; and
    a calculator responsive to said droop for determining the incremental shift in the output voltage waveform of said given inverter operating in a predetermined limited frequency range to enable equal current sharing among the inverters.

2. The non-linear frequency droop control system of claim 1 further including a load power calculator for calculating said inverter power level.

3. The non-linear frequency droop control system of claim 2 in which said load power calculator includes a voltage sensing circuit for sensing the output load voltage of the inverters, an RMS calculator circuit for calculating the RMS of said output voltages and a phase-lock loop circuit for measuring the phase of said output voltages at the point of load.

4. The non-linear frequency droop control system of claim 3 in which said load power calculator includes a current measurement circuit for moving the current into and out of said inverters.

5. The non-linear frequency droop control system of claim 4 in which said load power calculator includes a voltage component calculator circuit responsive to the RMS voltages and phase to calculate the voltage components, and a power calculator circuit responsive to said voltage components and measured current to produce the active and reactive power.

6. The non-linear frequency droop control system of claim 1 in which said non-linear droop control generator includes a look-up table.

7. The non-linear frequency droop control system of claim 6 in which said look-up table contains a range of different droop constants corresponding to a range of different power levels for maintaining the isochronous frequency operation of said given inverter in said predetermined limited frequency range over the whole range of said different power levels.

8. The non-linear frequency droop control system of claim 1 in which said inverter is a multiphase inverter.

9. A method of non-linear frequency droop control for isochronous frequency operation of parallel inverters comprising;
    generating a droop constant corresponding to the power level of a given inverter for maintaining the predetermined frequency range of the given inverter;
    generating a droop from the given inverter power level and the droop constant; and
    calculating in response to the droop the incremental shift in the output voltage waveform of the given inverter operating in a predetermined limited frequency range to enable current sharing among the inverters.

10. The method of claim 9 in which generating the droop constant includes referring to a look-up table which contains a range of different droop constants corresponding to a range of different power levels for maintaining the isochronous frequency operation of said given inverter in said predetermined limited frequency range over the whole range of said different power levels.

11. A method of non-linear frequency droop control for isochronous frequency operation of a parallel inverter in a parallel inverter system comprising generating a droop constant corresponding to the power level of a given inverter for maintaining the predetermined frequency range of the given inverter and shifting the output voltage waveforms of the given inverter to keep the frequency within the virtually isochronous limited frequency range.

* * * * *